No. 795,499. PATENTED JULY 25, 1905.
E. EVANS & W. A. GERNER.
GEARING.
APPLICATION FILED OCT. 27, 1904.
2 SHEETS—SHEET 2.
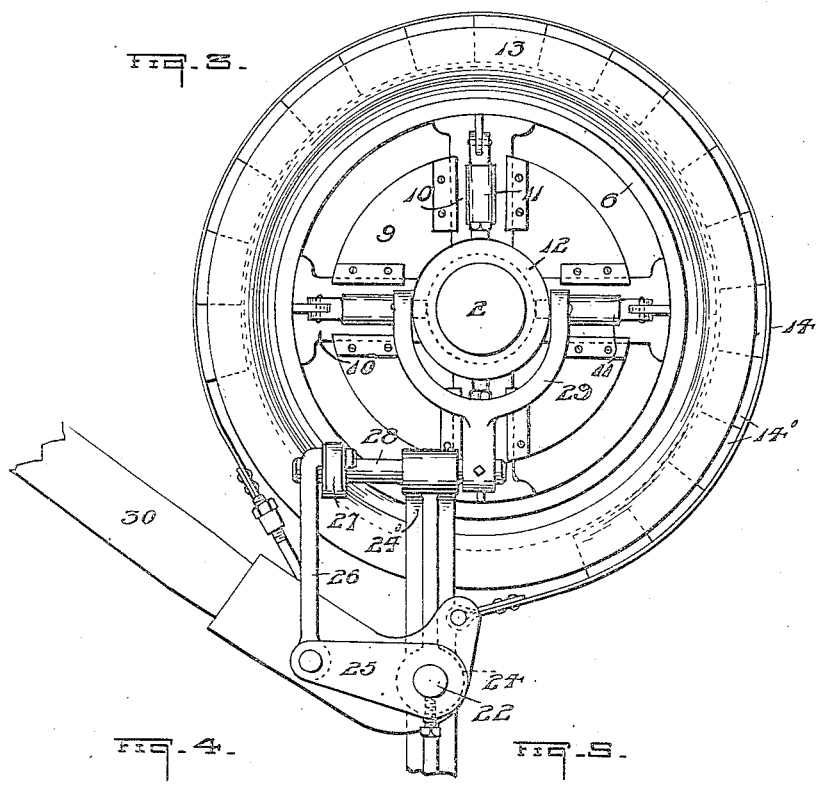
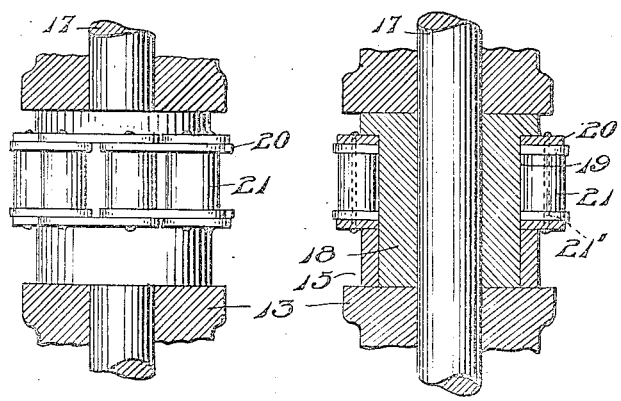
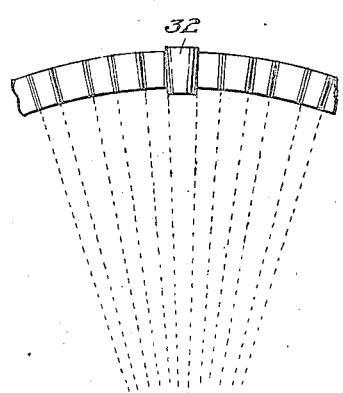
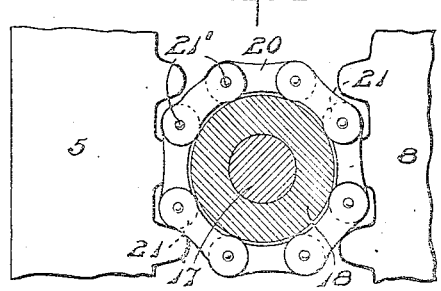
WITNESSES:
INVENTORS

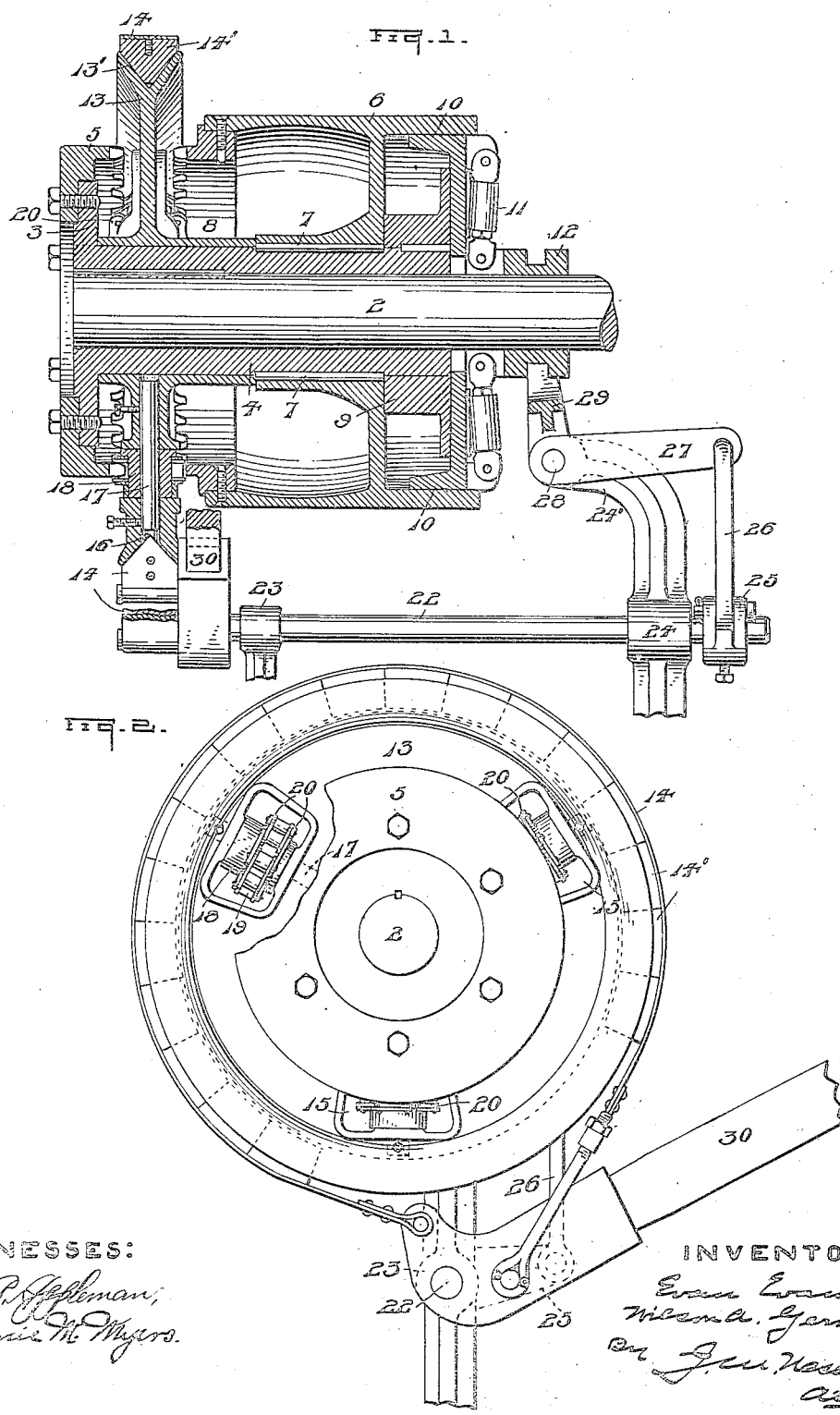

UNITED STATES PATENT OFFICE.

EVAN EVANS AND WILSON A. GERNER, OF BUTLER, PENNSYLVANIA, ASSIGNORS TO THE EVANS MANUFACTURING COMPANY, LIMITED, OF BOROUGH OF BUTLER, PENNSYLVANIA.

GEARING.

No. 795,499.         Specification of Letters Patent.         Patented July 25, 1905.

Application filed October 27, 1904. Serial No. 230,187.

*To all whom it may concern:*

Be it known that we, EVAN EVANS and WILSON A. GERNER, citizens of the United States, residing at Butler, in the county of Butler and State of Pennsylvania, have invented certain new and useful Improvements in Gearing, of which the following is a specification, reference being had therein to the accompanying drawings.

This invention relates to mechanism for imparting rotary motion to a belt-pulley or other rotating body in reverse directions without regard to the direction of rotation of the drive-shaft, and the general purpose of the invention is to simplify, improve, and render more efficient this type of apparatus.

A further purpose is to improve the internal gearing and other structural features of the clutch-pulley mechanism.

The invention consists in the novel features of construction and combination and arrangement of parts, hereinafter fully described and claimed, and illustrated by the accompanying drawings, wherein—

Figure 1 is a longitudinal sectional view of the improved mechanism. Figs. 2 and 3 are opposite end views of the same. Figs. 4, 5, and 6 are detail views of the roller-chain gears. Fig. 7 illustrates a slight modification in the form of chain-roller.

Referring to the drawings, 2 designates an engine or other drive-shaft, and permanently secured thereto is the driving-gear of the clutch mechanism. The driving-gear is here shown embodied in an annular head or body 3, carried at one end of an elongated hub 4, the latter being keyed to the shaft, and detachably secured to the body 3 is the toothed gear-ring 5, which is so arranged that the teeth project from the inner face of the drive-gear. This construction is preferable to forming the teeth integral with the gear-body, for if a tooth is broken it is only necessary to replace the gear-ring.

A belt-pulley 6 is rotatably mounted on hub 4, preferably on a roller-bearing 7, and detachably secured to one end of the pulley is the gear-ring 8, which is of the same size as ring 5 and faces the same. In the present embodiment of the invention pulley 6 and ring 8 constitute the driven gear. At the inner end of hub 4 is head 9, and slidable thereon are the radially-arranged clutch-shoes 10, which are adapted to engage the end of the pulley opposite gear-ring 8 and cause the pulley to rotate with the shaft. Shoes 10 are connected by links 11 with sleeve 12, slidable on shaft 2.

A circular carrier 13 is loosely mounted on hub 4 between the driving and driven gears and is formed with the V-shaped periphery 13' to receive shoes 14' on brake-band 14. The carrier is formed with openings 15, which are intersected by the radial pin-cavities 16, the latter opening through the carrier periphery and removably confining journal-pins 17. Mounted on each of these pins in opening 15 is roller 18, formed with a circumferential depression 19, and confined in this depression is the chain-gear 20, having rollers 21 on the pivot-pins 21' thereof. The roller-chain gears or pinions mesh with and thus operatively connect the driving and driven gears. Rollers 18 turn on pins 17, and chains 20 may turn on or with rollers 18, as may be preferred. Chain-rollers 21 may be straight or cylindrical or they may be tapered, as shown at 32, Fig. 7, to conform to the converging side faces of the gear-teeth meshing therewith.

A rock-shaft 22 parallels drive-shaft 2, being mounted in suitable bearings or brackets 23 and 24 and having at one end crank 25, which is connected by link 26 with arm 27 of the rock-shaft 28, the latter being mounted in extension 24' of bearing or bracket 24. Carried by shaft 28 is the yoke 29 for moving the clutch-operating sleeve 12. Secured to the opposite end of shaft 22 is lever 30, to which the extremities of brake-band 14 are connected, as shown, so that movement of the lever in one direction so tightens the brake as to hold carrier 13 fixed and at the same time, through the medium of the described intermediate connections, retracts clutch-shoes 10. Thus with carrier 13 held fixed and pulley 6 free to rotate independently of the shaft the power is transmitted through chain-gears 20, and pulley 6 is caused to rotate in direction opposite to that of the driving-gear and shaft 2. An opposite movement of lever 30 releases the brake-band and at the same time moves outward clutch-shoes 10, thus positively securing pulley 6 to shaft 2 and causing said parts to turn together. At such time carrier 13 is free to turn with the drive-shaft, so that all parts turn or rotate together with the latter.

There is comparatively little friction between roller-chain gears and driving and driven gears, and the operation is practically noiseless. Furthermore, the appreciable elasticity of the chain-pinions renders them more durable than solid-toothed pinions heretofore used, and danger of stripping the teeth of the driving and driven gears is practically eliminated. The detachable gear-rings which form the toothed elements of the driving and driven gears may be readily removed and replaced when teeth are broken, thus making it unnecessary to renew any other part.

It will be understood that the driven element may include a belt-pulley, as here shown, or any other form of gearing or rotating body that it may be desired to drive. The invention may be changed or modified in various other ways without departing from the spirit and scope thereof as defined by the appended claims.

We claim—

1. An improved gear-wheel comprising a support having a continuously-curved exterior surface, and an endless sprocket-chain extending around and having a continuous bearing against said surface.

2. An improved gear-wheel comprising a circular support, and an endless sprocket-chain encircling and having a continuous bearing on the periphery of the support.

3. An improved gear-wheel comprising a circular support having a continuous peripheral recess, and an endless sprocket-chain encircling the support and closely fitting the recess.

4. An improvement in gearing comprising a circular support, a sprocket-chain encircling and closely fitting the periphery of the support and having a continuous bearing thereon, and driving and driven sprocket-wheels meshing with the different portions of said chain.

5. The combination of a driving-gear, a driven gear, chain-gears between and meshing with the driving and driven gears, and means for supporting the chain-gears in fixed position between the driving and driven gears.

6. The combination of a driving-gear, a driven gear, means for rigidly connecting the driving and driven gears, chain-gears between and meshing with the driving and driven gears, a movable support for the chain-gears, and means for holding said support immovable.

7. The combination of a driving-gear, a driven gear, chain-gears between and connecting the driving and driven gears, a movable carrier for the chain-gears, and means operating alternately to rigidly connect the driving and driven gears and to hold the chain-gear carrier against rotation.

8. The combination of driving and driven gears capable of independent rotation on a common axis and having separated and opposing gear-faces projecting in directions parallel with said axis, chain-gears between and at opposite sides meshing with the driving and driven gears, a movable carrier for the chain-gears, means for holding the carrier immovable, and means for rigidly uniting the driving and driven gears.

9. The combination of a shaft, a driving-gear secured thereto, a driven gear loose on the shaft, clutch mechanism for securing the driven gear to the shaft, a carrier loose on the shaft between the driving and driven gears, chain-gears rotatably mounted in the carrier between and meshing with the driving and driven gears, and means for holding the carrier against rotation.

10. The combination of a shaft, a driving-gear secured thereto, a driven gear loose on the shaft, clutch mechanism for securing the driven gear to the shaft, a carrier loose on the shaft between said gears, rollers mounted in the carrier, chain-gears encircling the rollers and meshing with the driving and driven gears, and means for holding the carrier against rotation.

11. The combination of a shaft, a driving-gear secured thereto, a driven gear loose on the shaft, clutch mechanism for securing the driven gear to the shaft, a carrier loose on the shaft between said gears, radially-arranged bearings in the carrier, rollers mounted on the bearings, chain-gears encircling the rollers and meshing with the driving and driven gears, and means for holding the carrier against rotation.

12. The combination of a shaft, a driving element secured thereto, a toothed ring detachably secured to the driving element, a driven element loose on the shaft, a toothed ring detachably secured to the driven element and facing the corresponding ring of the driving element, clutch mechanism for securing the driven element to the shaft, a carrier loose on the shaft between the driving and driven elements, gears rotatably mounted in the carrier and meshing with said toothed rings, and means for holding the carrier against rotation.

13. The combination of a shaft, a driving-gear having an elongated hub secured to the shaft, a driven gear rotatably mounted on the hub, clutch mechanism for securing the driven gear to the hub, a carrier loose on the hub between said gears, gears mounted in the carrier and meshing with the driving and driven gears, and means for holding the carrier against rotation.

14. The combination of a shaft, a driving-gear secured thereto, a pulley loose on the shaft, clutch mechanism rotatable with the shaft and adapted to engage one end of the pulley, a gear-ring detachably secured to the opposite end of the pulley and facing the driving-gear, a carrier loose on the shaft between the driving-gear and said gear-ring, gears mounted in the carrier and meshing with said driving-gear and gear-ring, and means for holding the carrier against rotation.

15. The combination of a shaft, a driving-gear secured thereto, a driven gear loose on the shaft, clutch mechanism for securing the driven gear to the shaft, a carrier loose on the shaft between said gears, gears mounted in the carrier and meshing with the driving and driven gears, a brake-band for the carrier, and a rock-shaft operatively connected to the brake-band and the clutch mechanism, the connections between said parts being so constructed and arranged that movement of the rock-shaft in one direction tightens the brake-band and releases the clutch mechanism while opposite movement of the rock-shaft releases the brake-band and engages the clutch mechanism.

In testimony whereof we affix our signatures in presence of two witnesses.

EVAN EVANS.
W. A. GERNER.

Witnesses:
SYLVESTER F. BOWSER,
S. F. LETSHAW.